United States Patent
Fang

(10) Patent No.: US 9,965,678 B2
(45) Date of Patent: May 8, 2018

(54) METHOD FOR RECOGNIZING TABLE AND FLOWCHART IN DOCUMENT IMAGES

(71) Applicant: KONICA MINOLTA LABORATORY U.S.A., INC., San Mateo, CA (US)

(72) Inventor: Gang Fang, San Bruno, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 62 days.

(21) Appl. No.: 15/197,595

(22) Filed: Jun. 29, 2016

(65) Prior Publication Data
US 2018/0005028 A1     Jan. 4, 2018

(51) Int. Cl.
G06K 9/46   (2006.01)
G06K 9/00   (2006.01)
G06T 7/00   (2017.01)

(52) U.S. Cl.
CPC ..... *G06K 9/00456* (2013.01); *G06K 9/00449* (2013.01); *G06T 7/0085* (2013.01); *G06T 2207/20224* (2013.01); *G06T 2207/30176* (2013.01); *G06T 2207/30242* (2013.01); *G06T 2210/12* (2013.01)

(58) Field of Classification Search
CPC .......... G06K 9/00442; G06K 9/00456; G06K 9/00449; G06K 9/00416; G06K 9/4642; G06T 7/73; G06T 7/41; G06T 7/80; G06T 7/251; G06T 7/0085; G06T 2207/10016; G06T 2207/30221; G06T 2207/20224; G06T 2207/30176; G06T 2207/30242
See application file for complete search history.

(56) References Cited

U.S. PATENT DOCUMENTS

| | | | | |
|---|---|---|---|---|
| 6,397,165 B1 * | 5/2002 | Fiekowsky | .......... | G01N 21/956 356/256 |
| 6,535,897 B1 * | 3/2003 | Altman | .............. | G06K 9/00442 715/203 |
| 7,197,372 B2 * | 3/2007 | Hazama | ............. | G05B 19/4097 345/420 |

(Continued)

OTHER PUBLICATIONS

Kieninger, "Table Structure Recognition Based on Robust Block Segmentation", Proceedings of SPIE—The International Society for Optical Engineering Jan. 1999; DOI: 10.1117/12.304642, 1999.

*Primary Examiner* — Ali Bayat
(74) *Attorney, Agent, or Firm* — Chen Yoshimura LLP

(57) ABSTRACT

A table and flowchart detection method is disclosed. First, based on connected component analysis and the sizes of the connected components, a target connected component that corresponds to possible elements of table or flowchart is detected in the input image. The target connected component is broken into corners and edges that connect the corners. Based on the relationship between the corners and edges, it is determined whether the target connected component is a table or a flowchart. For table detection, the edges and corners are linked into horizontal sets and vertical sets, and based on corner counts in the horizontal sets and vertical sets, it is determined whether the target connected component is a table. For flowchart detection, the boundary boxes and connecting lines between boundary boxes are detected to determine whether the target connected component is a flowchart.

18 Claims, 17 Drawing Sheets

(56) References Cited

U.S. PATENT DOCUMENTS

| | | | |
|---|---|---|---|
| 7,583,841 B2 * | 9/2009 | Lin | G06K 9/00416 382/179 |
| 7,672,543 B2 * | 3/2010 | Hull | G06F 17/3002 358/1.15 |
| 2005/0063592 A1 | 3/2005 | Li et al. | |
| 2015/0093021 A1 | 4/2015 | Xu et al. | |

* cited by examiner

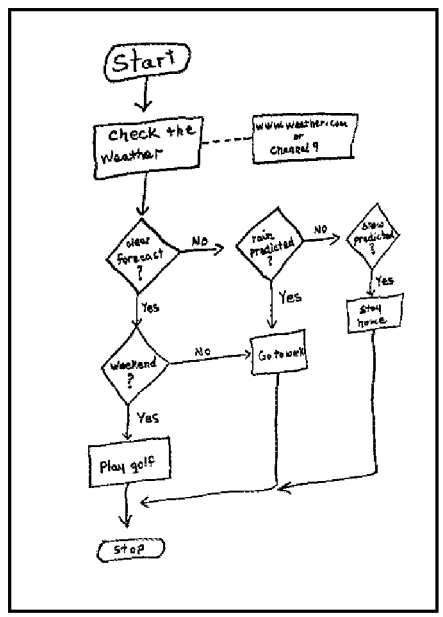
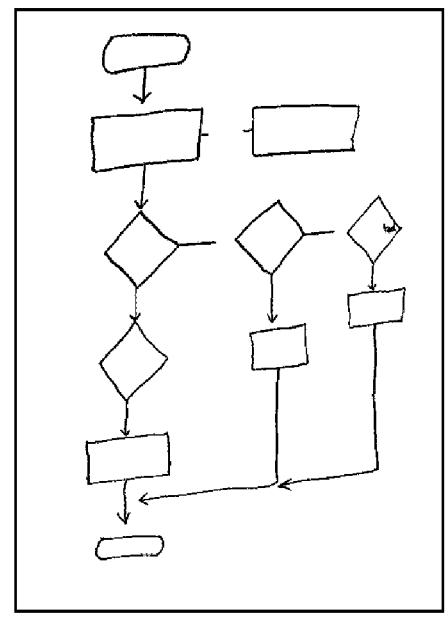
Fig. 9              Fig. 10
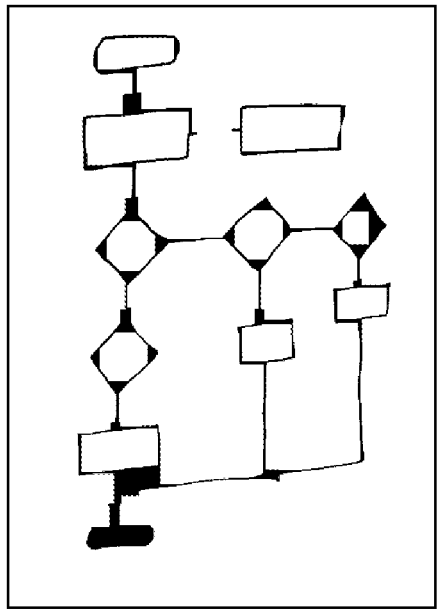
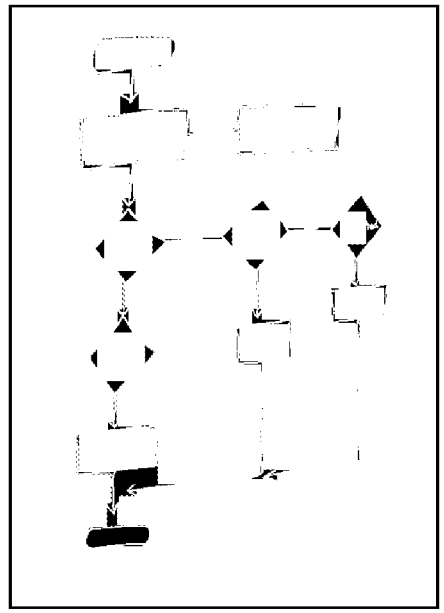
Fig. 11             Fig. 12

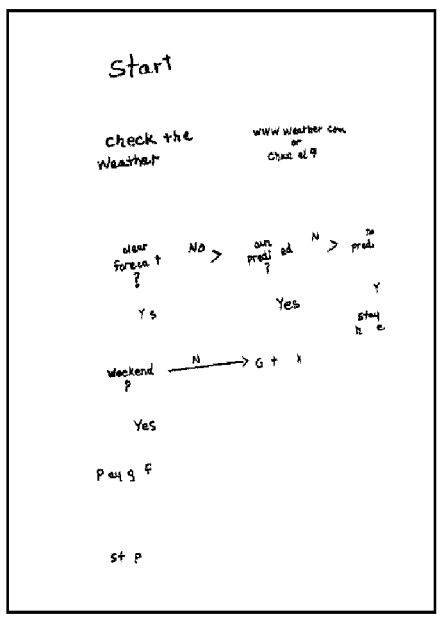
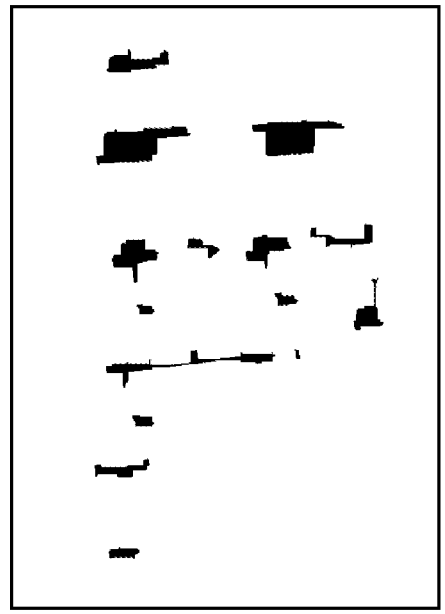
Fig. 13                    Fig. 14
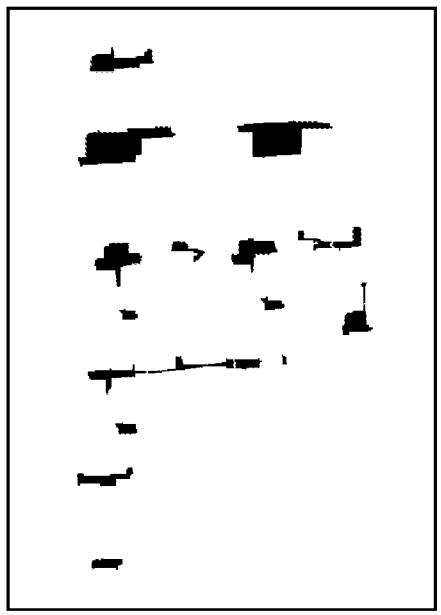
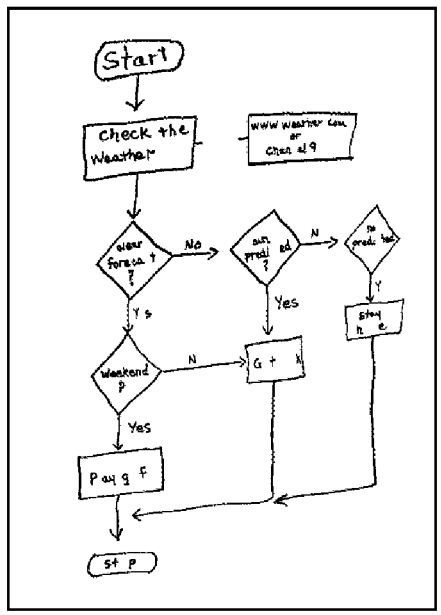
Fig. 15                    Fig. 16

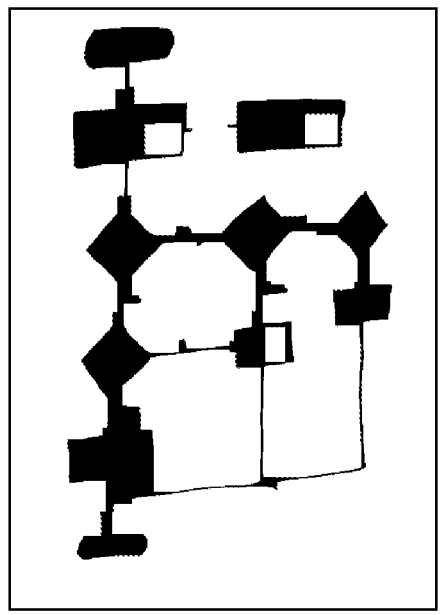 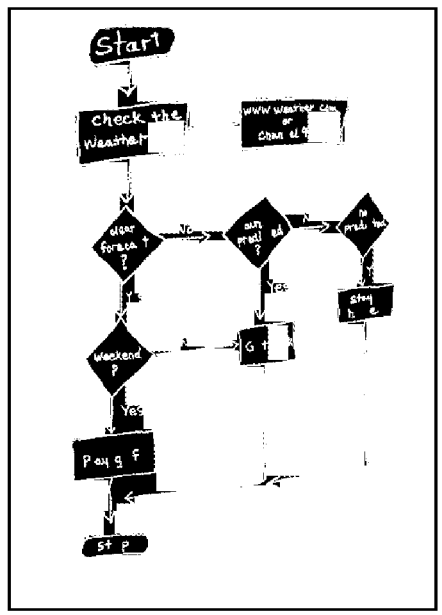
Fig. 17                                  Fig. 18
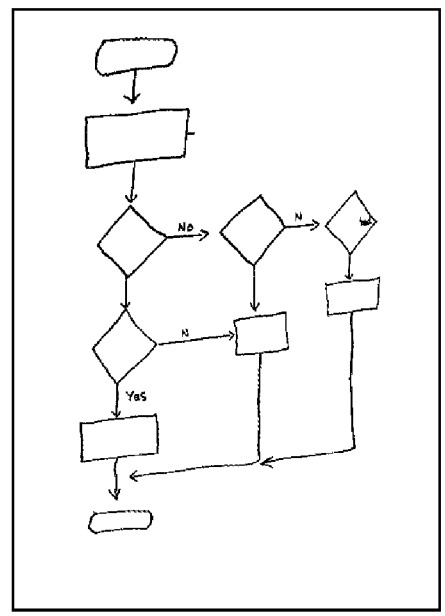
Fig. 19

METHOD FOR RECOGNIZING TABLE AND FLOWCHART IN DOCUMENT IMAGES

BACKGROUND OF THE INVENTION

Field of the Invention

This invention relates to document image processing, and in particular, it relates to a method for recognizing table and flowchart in a document image.

Description of Related Art

Document images refer to digital images that represent documents. A document image may be generated by scanning or photographing a hardcopy document, or generated from other electronic data such as a word processing document. The contents of a document image may include pure text, tables, flowcharts, other graphics such as barcodes, logos, charts, etc., and images such as photos. Flowcharts refer to charts that contain text enclosed in polygons or other shaped boundaries, lines pointing from one boundary to another, etc. Tables are typically rectangular shaped objects with horizontal and vertical lines diving the table into cells. Document image segmentation refers to a process in document image processing where these different types of contents are recognized and separated from each other into sub-images containing only one type of content so that they can be subsequently processed, for example, to extract text using OCR (optical character recognition), etc. Various document segmentation techniques are known. In some document images, especially those generated from hand-written documents, some graphic objects may be deformed, e.g. the lines may be not straight or not vertical or horizontal, and it can be challenging to correctly recognize different types of contents such as tables, flowcharts, etc. in such document images.

Various algorithms have been proposed to recognize table and flowchart text based on different characteristics of each type. Table recognition may be based on detecting straight line segments using Hough transform or other line detectors. However, in cases of hand-written documents, since there is no guarantee that the four boundaries of a table will be straight line segments, line detector based approach can be unstable, and computationally heavy and complicated analyses may be required. Some connected component based method can be unstable in the case of empty tables, or when part of the text overlap line segments of the table. When the table is empty, there is no relationship among the contents which can be used for table recognition. For flowchart recognition, finding primitive shapes (polygons, etc.) and analyzing the relationship among them or among the CCs are often used techniques. The analysis is complicated when there are touching or un-touching flowchart elements (shapes, lines, etc.). Further, conventional recognition approaches are commonly bottom-up in style, where the basic components are extracted first followed by analysis of those components. Thus, many restrictions exist, for example, some methods can only handle convex polygons, relatively straight lines, etc. Also different features are used to analyze different type of objects.

SUMMARY

Accordingly, the present invention is directed to methods and related apparatus for recognizing tables and flowcharts that substantially obviate one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing apparatus for recognizing an input document image as a table or a flowchart, which includes: (a) detecting a target connected component from the input image which represents candidates of lines of a table or text boxes and connecting lines of a flowchart in the input image; (b) separating the target connected component into a plurality of corners and a plurality of edges that connect the plurality of corners; and (c) based on spatial relationships between the plurality of corners and the plurality of edges, determining whether the target connected component is a table or a flowchart or neither.

In some embodiments, step (a) includes: performing a connected component analysis to identify all connected components in the input image; detecting large connected components that are larger than a threshold size; and merging some of the large connected components together based on their spatial relationships to form the target connected component.

In some embodiments, to detect a table, step (c) includes: (c1) determining whether each edge is a horizontal edge, a vertical edge, or an unknown edge; (c2) forming one or more horizontal lists of corners and one or more vertical lists of corners, each horizontal list of corners containing corners that are connected to each other by horizontal edges or known edges, each vertical list of corners containing corners that are connected to each other by vertical edges or known edges; (c3) determining whether or not the target connected component is a table based on numbers of corner in the one or more horizontal lists of corners and the one or more vertical lists of corners.

In some embodiments, if in step (c3) it is determined that the target connected component is not a table, then determining whether or not the target connected component is a flowchart, including: (c4) detecting one or more potential boundary boxes, including: performing a close operation on a target image formed by the target connected component; applying a flood fill operation to the target image after the close operation; inverting the target image after the flood fill operation; and detecting connected components after the inverting operation, wherein the detected connected components constitute the potential boundary boxes; (c5) from among the edges detected in step (b), identifying those that connect two potential boundary boxes as connector edges; (c6) for each potential boundary box, if the potential boundary box is not encircled by any connector edges and is connected to one or more other potential boundary box by one or more connector edges, identifying the potential boundary box as a boundary box; (c7) using the boundary boxes identified in step (c6), counting a number of boundary boxes; and (c8) determining the target connected component to be a flowchart if the counted number of boundary boxes is greater than a threshold number.

In aspects, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 7-34 illustrate examples of images and the result of various processing steps in the table and flowchart recognition methods according to embodiments of the present invention.

DETAILED DESCRIPTION OF PREFERRED EMBODIMENTS

Embodiments of the present invention provide a method for detecting tables in an input document image. The document image is a binary image where each pixel has a value of either black or white. Here, it is assumed that the document background is white and document content is black, although the method described below can be readily modified for white content on black background.

Generally stated, the table and flowchart detection method includes the following steps. First, based on a connected component analysis of the input image and the sizes of the connected components, a target connected component that corresponds to possible elements of table or flowchart (such as table lines, flowchart boxes and lines) is detected in the input image. Then, the target connected component is broken into corners and edges for analysis. In this step, the corners are detected in the connected component, and the edge lines are the parts of the connected component that are divided by the corners. Then, based on the relationship between the edges and the corners, it is determined whether the target connected component is a table or a flowchart. For table detection, the lines and corners are linked into horizontal sets and/or vertical sets, and based on the corner counts in the horizontal sets and vertical sets, it can be determined whether the target connected component is a table. This method can detect empty tables, and can also handle hand written tables. For flowchart detection, the boundary boxes and connecting lines between boundary boxes are detected to determine whether the target connected component is a flowchart.

It is noted that prior to applying the recognition methods, an original input document image has been processed to separate different types of contents, so each document image to be processed using the recognition method here contains only one type of content, and the recognition method determines which type the content is.

The table and flowchart detection method is described in more detail below with reference to FIGS. 1-6 and the examples shown in FIGS. 7-34.

Figure 1:
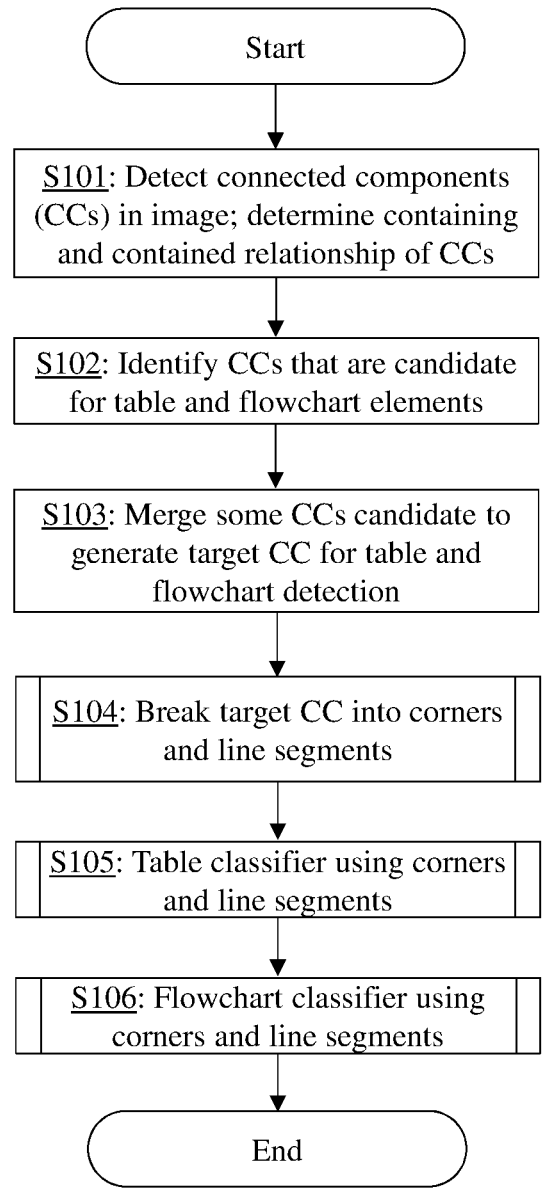
FIGS. 1-6 are flowcharts that schematically illustrate a process for recognizing table and flowchart in a document image according to embodiments of the present invention.
Figures 7, 8:
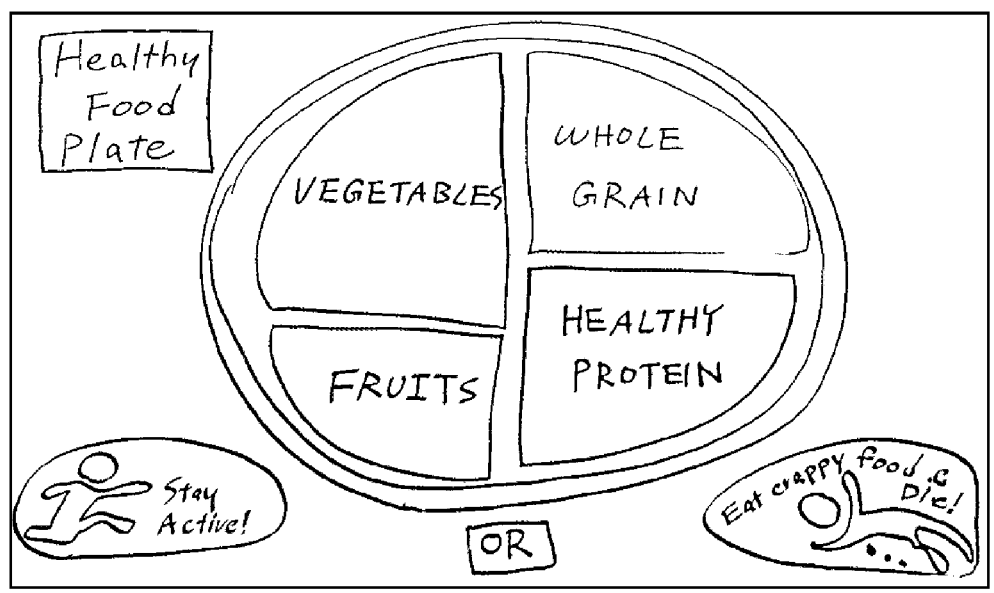
Figure 20:
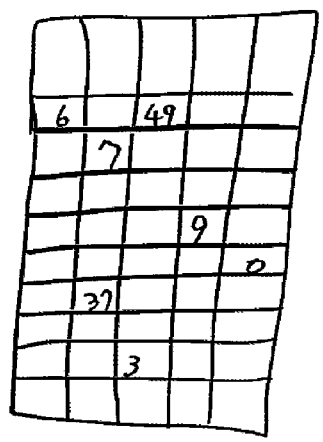
Figure 21:
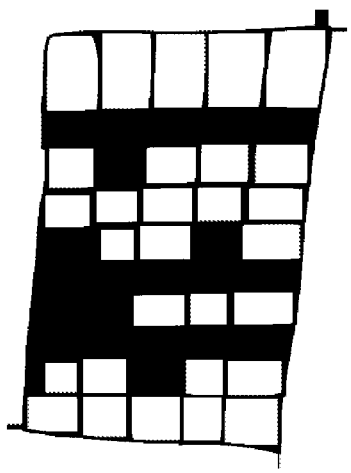

FIG. 1 shows the overall flow of the method. In step S101, a connected component analysis is performed on the entire input image to obtain connected components in the image. In a binary image, a connected component (CC) is a collection of connected pixels having the same value (e.g. black). The result of the connected component analysis is a list of CCs identified in the image. In a preferred implementation, the CCs are represented by assigning a CC index label to each pixel location of the image, so that pixels belonging to the same CC have the same CC label. Step S101 also includes analyzing the containing and being contained relations of the CCs. In other words, for each CC, the CC that completely contains it is identified. For example, in the image shown FIG. 7, the CCs of the characters are contained by the CC of the table. If there are several CCs that contain one CC (an example is shown in FIG. 8), the CC that is the closest to the contained CC is identified as the containing CC.

In step S102, based on the assumption that the CCs of the text characters should be of small sizes and the CCs of tables and flowchart elements (e.g., table lines, text box boundaries, connecting lines between text boxes, etc.) should be of large sizes, some CCs are identified as candidates of table or flowchart elements to be further analyzed. More specifically, the mean stroke widths s of all the CCs is calculated, and the mean CC width (e.g. size in the horizontal direction) and height (e.g. size in the vertical direction) are also calculated. Any suitable algorithm may be used to calculate stroke width of CCs, many of which are well known. For text characters of typical fonts, the mean CC width and height are within the range from 4 s to 8 s. Then, all the CCs are enumerated; if a CC contains other CCs, or is much larger than the mean CC size (width and/or height), that CC is identified as a candidate CC to be further analyzed, and its information is put into a list. In the example shown FIG. 7, the CC of the table will be identified as a candidate CC. As a result of step S102, all the CCs are classified into two groups, group 1 being the candidate CCs put in the list, i.e. those that may be parts of a table or flowchart (or other graphics), and group 2 being the rest of the CCs. Most text characters are expected to be in group 2.

In step S103, some of the CCs in group 1 are merged with each other, and some of the CCs in group 2 are merged with CCs in group 1. This step is to deal with the possibility that a stroke or line that should be continuous may be broken in the binary image (for example, when a grayscale image is binarized, some lighter or thinner parts of lines may be lost), or the fact that in a flowchart sometimes the connecting arrow lines do not touch the boundary boxes that they are meant to connect (in particular, when the flowchart is drawn by hand). Therefore, step S103 analyzes whether some CCs in group 1 can be connected or merged with each other.

Stated generally, in step S103, the candidate CCs (group 1 CCs) that are close to one another according to defined criteria are merged together. In addition, some non-candidate CCs (group 2 CCs) that are close to one or more candidate CCs may be merged with the candidate CCs. In preferred embodiments, merging two or more CCs is done by changing the CC labels of the two or more CCs to the same label, so these CCs are deemed to be the same CC (even though the pixels of these CCs are not actually all connected).

As the result of step S103, most (or all) of the candidate CCs and some of the non-candidate CCs are merged as one or more CCs, referred to as the "target CCs" for convenience. They are put in an image, referred to as the "target CC image" for convenience. FIG. 19 shows the target CC image for the flowchart example of FIG. 9. The remaining steps of the method of FIG. 1 are applied to the target CC image.

In one particular implementation, step S103 is performed by applying various close, subtraction, dilation, and CC analysis operations. This analysis is done in 3 phases, described below with reference to the examples shown in FIGS. 9-19. FIG. 9 shows an example of an input image containing a flowchart.

Phase I: Draw all the CCs in group 1 to an image, referred to as the "group 1 image" for convenience. FIG. 10 shows the group 1 image for the example of FIG. 9. Perform a close operation using a given distance (for example, two times the mean stroke width s) on the group 1 image, and the result (shown in FIG. 11) is referred to as a "group 1 close image" for convenience. Then, subtract the group 1 image (FIG. 10) from the group 1 close image (FIG. 11) to generate an image (shown in FIG. 12), referred to as a "group 1 difference image" for convenience. Note that when subtracting two images, pixel value 0 minus pixel value 1 equals pixel value 0.

Perform CC analysis on the group 1 difference image (FIG. 12). For each CC in the group 1 difference image (FIG. 12), if it touches at least two of the CCs in the group 1 image (FIG. 10), it will be identified, referred as an "intermediate CC" for convenience. Otherwise, the CC is not considered. In FIG. 12, one example of an intermediate CC is the one between the "stop" box at the bottom of the original image and the arrow above it.

Enumerate each intermediate CC identified above; identify the pixels from the CCs in the group 1 image (FIG. 10) that touch (i.e. overlap with) the intermediate CC. An analysis is performed to determine whether these pixels belong to an arrow line. Any suitable algorithm may be used for this arrow line determination; one preferred algorithm is described in detail later. If the pixels belong to an arrow line, the CC list of the original image (as generated by step S101) is modified to merge together the CCs that correspond to the CCs in the group 1 image (FIG. 10) which touch the intermediate CC.

In the example of FIG. 10, as the result of this step, all the CCs except the one near the top right corner will be merged together.

Phase II: Phase II is designed to deal with the situation of lines broken by binarization. Because of such broken lines, for example, some lines in a table may become disconnected from other parts of the table.

Draw all the CCs in group 1 to the group 1 image, and perform a dilation operation on the CCs using a distance that is, for example, twice the mean stroke width calculated above. Then check each CC in group 2 to determine if it touches at least one of the dilated CC. The CCs in group 2 that touch some dilated CCs are identified to form a group 3 of CCs.

Enumerate each CC in group 3; if the CC is within a threshold distance from two CCs in group 1 or one CC at two different locations, the CC list of the original image is modified to merge this CC in group 3 with the associated CC in group 1 (as a result, the CC is no longer in group 3). The threshold distance used in this step is, for example, ⅛ of the mean stroke width s, which is much smaller than the distance used in the close operation in Phase I.

Phase III: Draw all the remaining CCs in group 3 to a new image, referred to as a "group 3 image" for convenience. FIG. 13 shows the group 3 image in the example of FIG. 9. Perform a close operation on the group 3 image using a distance (which is preferably the same as the distance used in the close operation in Phase I), and the result (shown in FIG. 14) is referred to as a "group 3 close image" for convenience. Then, subtract the group 1 image calculated in Phase I (FIG. 10) from the group 3 close image (FIG. 14) to generate an image (shown in FIG. 15), referred to as a "group 3 difference image" for convenience.

Perform a CC analysis on the group 3 difference image (FIG. 15) to identify CCs. For each CC in the group 3 difference image (FIG. 15), identify the CCs in the group 3 image (FIG. 13) that is covered by the CC in the group 3 difference image (FIG. 15), and obtain the original CC identification labels (i.e. the CC labels as calculated step S101) of the covered CCs.

Draw all the CCs in group 1 and group 3 to a new image, referred to as a "combined group image" for convenience. FIG. 16 shows the combined group image in this example. Perform a close operation on the combined group image, and the result (shown in FIG. 17) is referred to as a "combined group close image" for convenience. Then, subtract the combined group image (FIG. 16) from the combined group close image (FIG. 17) to generate an image (shown in FIG. 18), referred to as a "combined group difference image" for convenience.

Perform CC analysis on the combined group difference image (FIG. 18). If some CCs in the combined group difference image (FIG. 18) connect one CC in the group 3 difference image (FIG. 15) with more than one CCs in the group 1 image (FIG. 10), analyze whether the CC in the group 3 difference image (FIG. 15) that is connected is an arrow line. If it is determined to be an arrow line, the CC list of the original image is modified to merge the CCs of the original image that are covered by the CC in group 3 difference image (FIG. 15) with the CCs in the group 1 image that it connects. As mentioned earlier, merging of CCs means changing their CC label to the same label.

This concludes Phase III and step S103.

As the result of step S103, most (or all) of the CCs in group 1 and some of the CCs in group 3 are merged as one CC, referred to as the "target CC" for convenience. They are put in an image, referred to as the "target CC image" for convenience. FIG. 19 shows the target CC image for the flowchart example of FIG. 9. The remaining steps of the method of FIG. 1 are applied to the target CC image.

Stated more generally, steps S102 and S103 are a step of detecting CCs in the input image that are candidates of table and flowchart structures, by detecting large CCs and merging them together based on their spatial relationships.

The following method for determining whether a target CC is a table, or a flowchart, or neither, is based on an analysis of the structure of the target CC by determining the relationship between its corners and the line segments (edges) that connect the corners.

In process S104, based on corner and line detection, the target CC is separated into multiple CCs representing corners and line segments (edges). The details of process S104 are described below with reference to FIG. 2.

Figure 2:
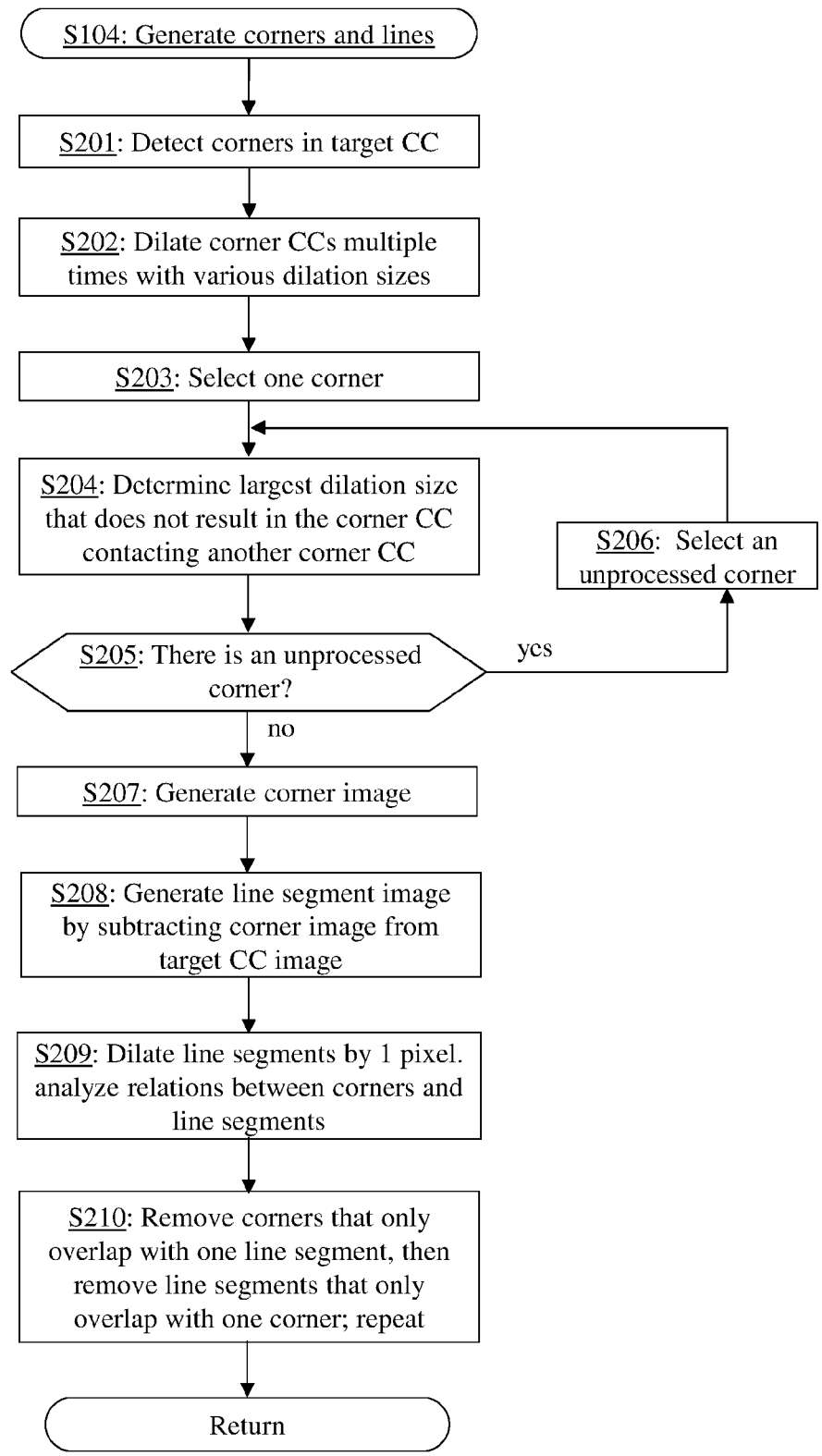
Figure 3:
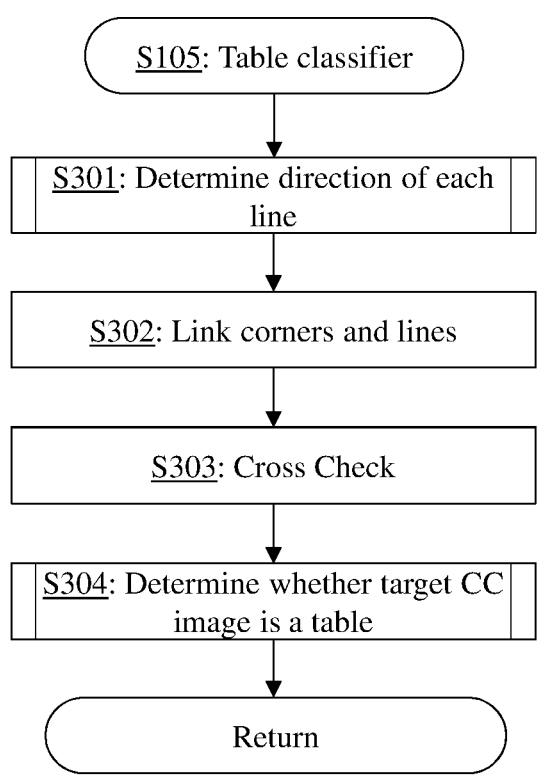
Figure 4:
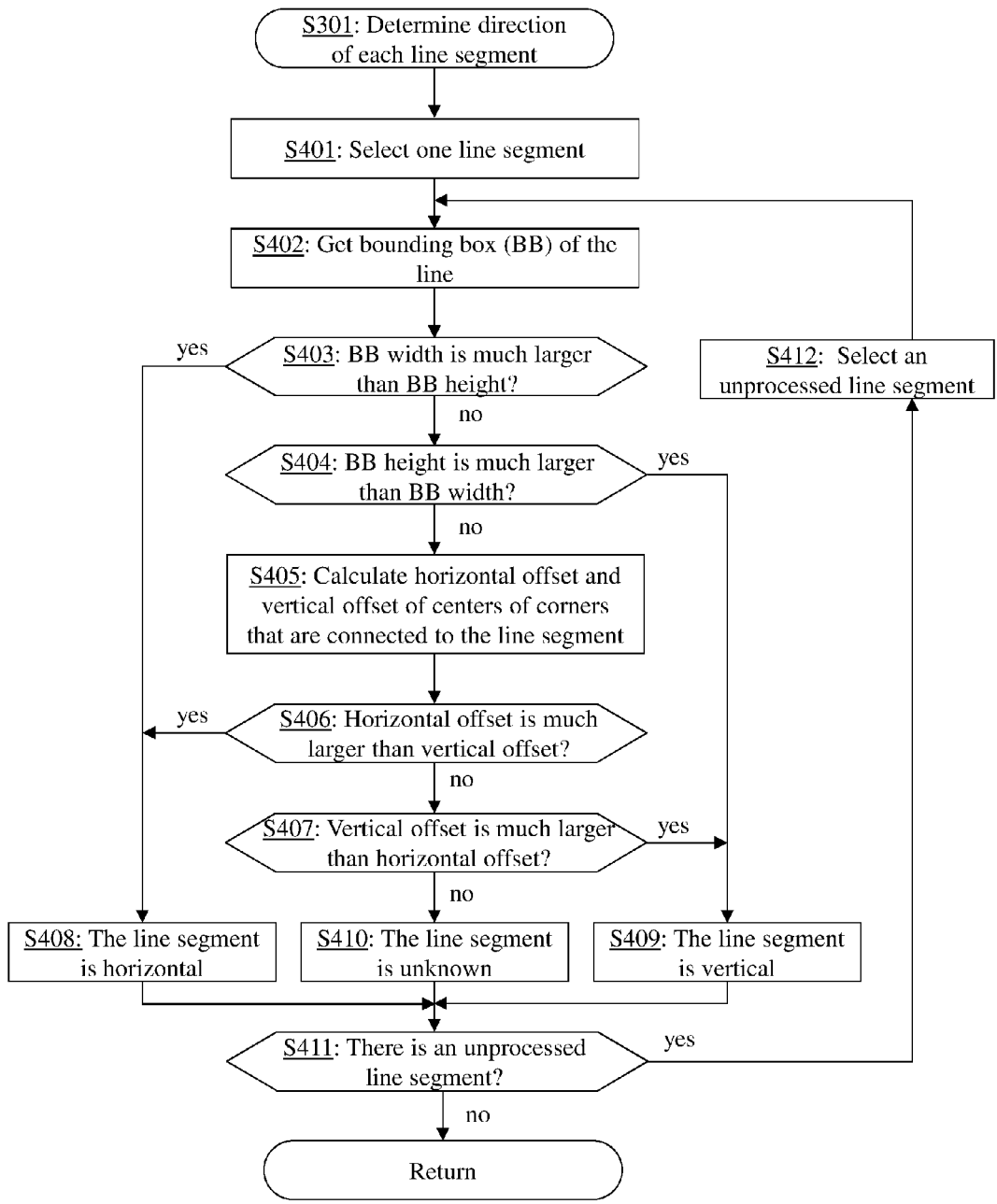
Figure 5:
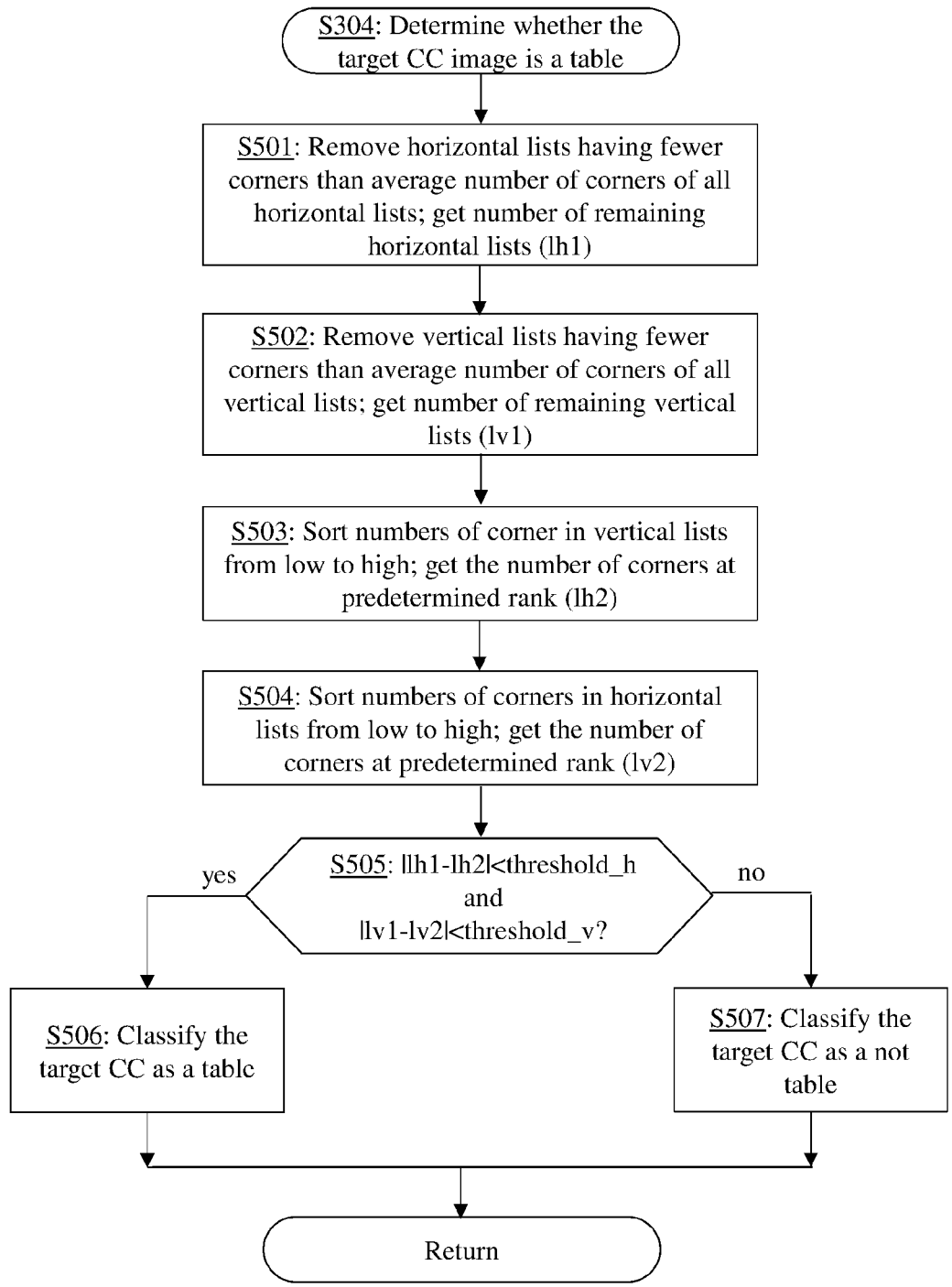
Figure 6:
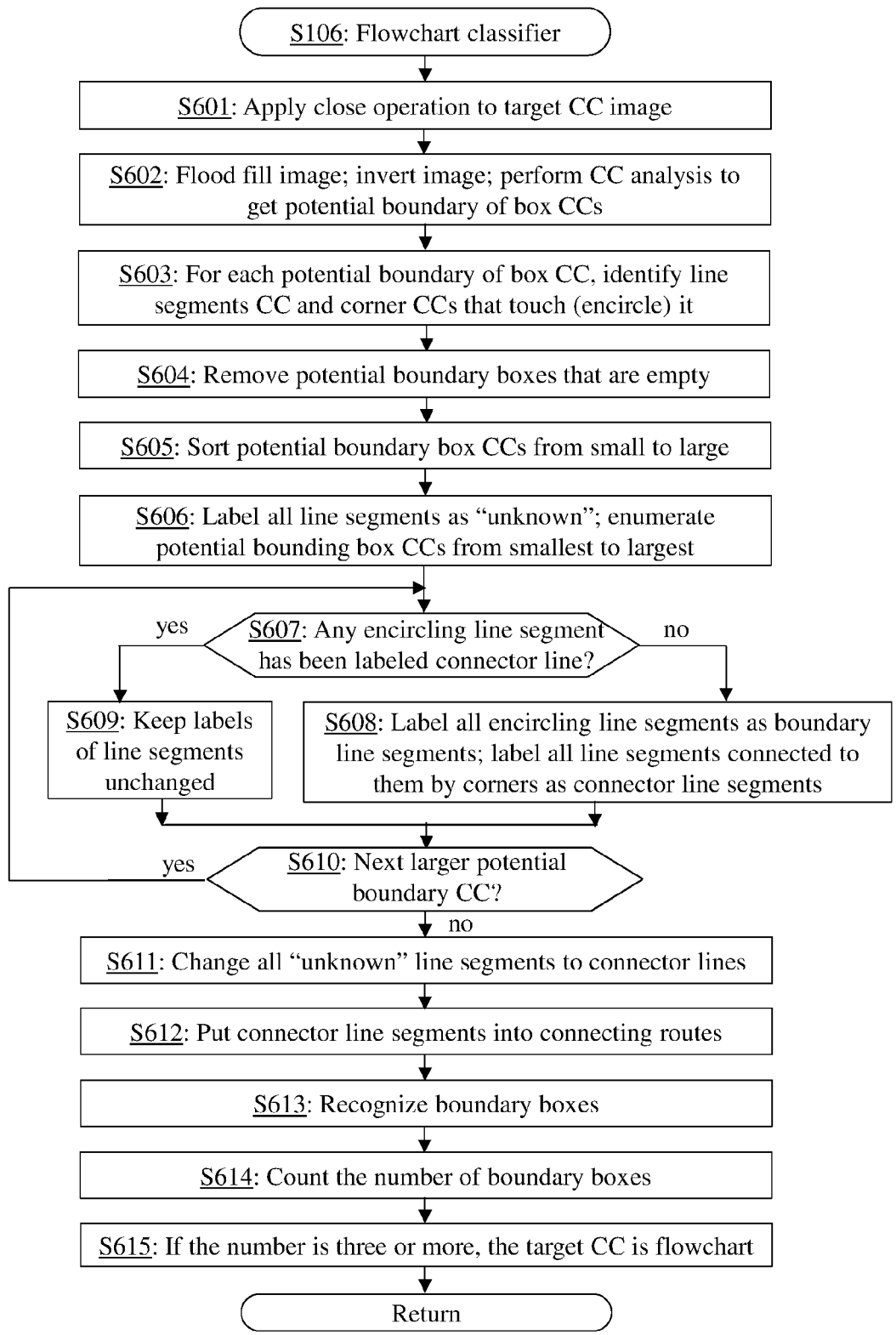

Referring to FIG. 2, first, in step S201, a corner detection method is applied to the target CC image to detect corners in it. Any suitable corner detection method may be used; in a preferred embodiment, the Harris corner detection method is used. As a result of step S201, a plurality of corner CCs are obtained.

Figure 22:
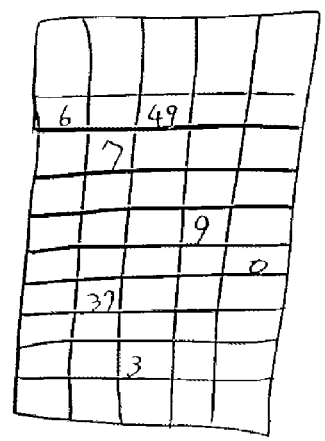
Figure 23A:
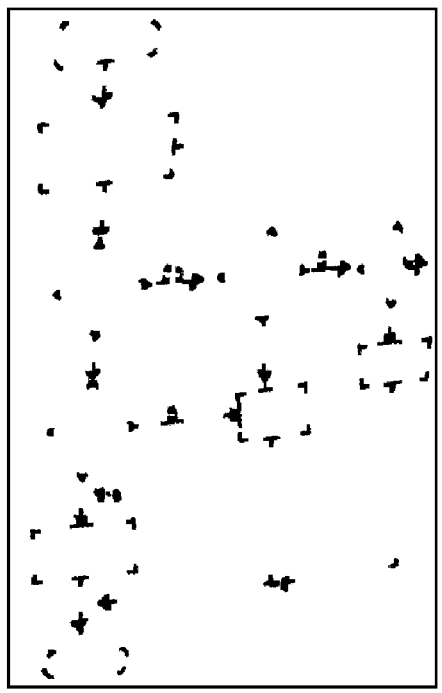
Figure 23B:
Figure 23C:
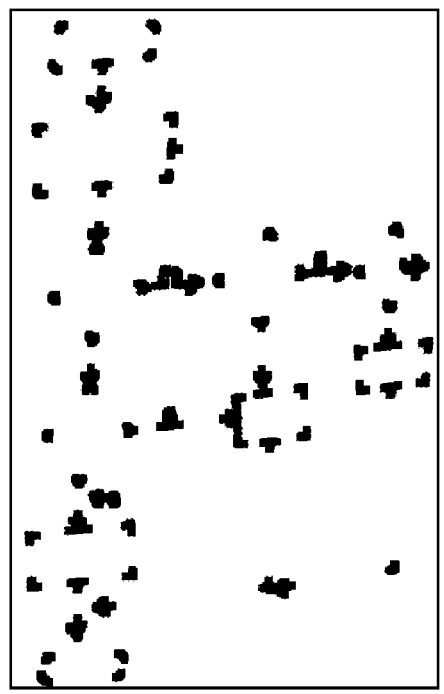
Figure 23D:
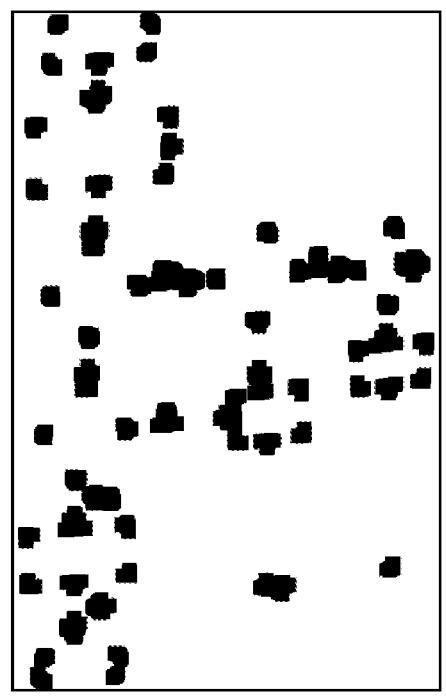

Harris corner detection uses a local window size as a parameter. Typically, a window size that is 4 times the mean stroke width is appropriate. In some cases, however, if the table cells are too small as compared to the stroke width, this window size may be too large for such a table. To determine whether this is the case, one method is to apply a close operation to the target CC and check whether the resulting CC is significantly different from the target CC. For example, in the example of a target CC for a table shown in FIG. 20, after the close operation (shown in FIG. 21), the size of the CC (as measured by the number of pixels in the CC) is significantly increased. If such a situation is detected, an erosion operation is performed on the target CC to make the stroke thinner (as shown in FIG. 22), and Harris corner detection is then applied to the CC after erosion, using a window size that is 4 times the mean stroke width which is now appropriate.

In steps S202-S208, the corner CCs are used to break the target CC into line segments. In step S202, the corner CCs are dilated multiple times using different sizes for the dilation operations. The resulting dilated corner CC images for the flowchart example of FIG. 19 are shown in FIGS. 23A-23D. FIGS. 30A-30D show the result of dilated corner CC images for a table example.

Figure 24:
Figure 31:
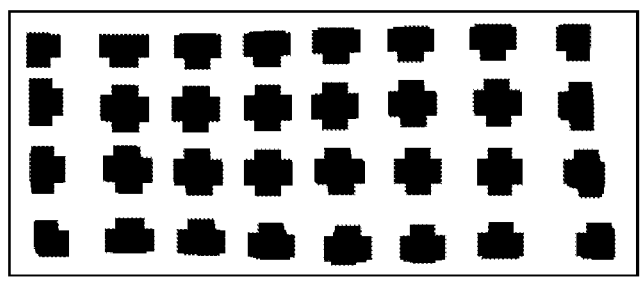

In steps S203-206, for each original corner CC (i.e. before any dilation), the largest one of the corresponding dilated CCs that does not result in the corner being connected with another corner CC is determined. To accomplish this, for each corner CC, starting from the un-dilated corner CC image, the corresponding CC in the next more dilated image is examined to determine whether the more dilated CC covers two or more of the CCs in the less dilated image. If it does, the corresponding CC in the less dilated image is used as the largest dilated CC for that corner. If it does not, the corresponding CC of the next yet more dilated image is examined the same way. Note that each dilated image is examined relative to the previous image in the sequence of more and more dilated images. The purpose of steps S203-S206 is to generate corner CCs of largest possible dilation (among the series of dilated image) while avoiding merging of neighboring corners. In step S207, the largest possible corner CCs found in steps S203-S206 are put in an image, referred to as "corner image" for convenience, an example of which is shown in FIG. 24 (for the flowchart example of FIG. 19). FIG. 31 shows the resulting corner image for the table example of FIGS. 30A-30D.

Figure 25:
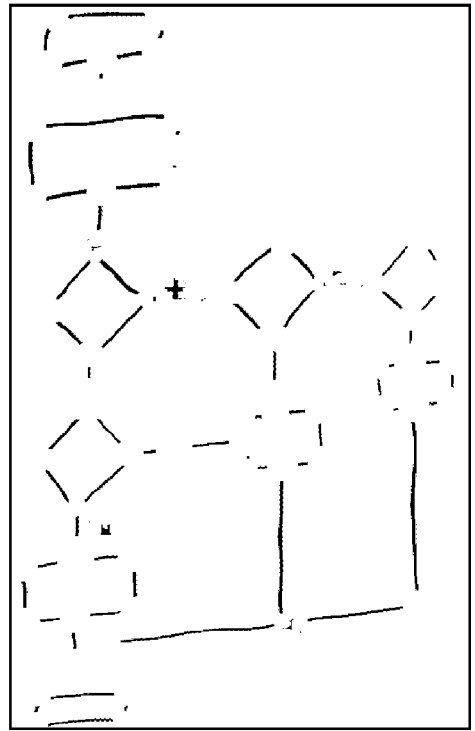
Figure 32:
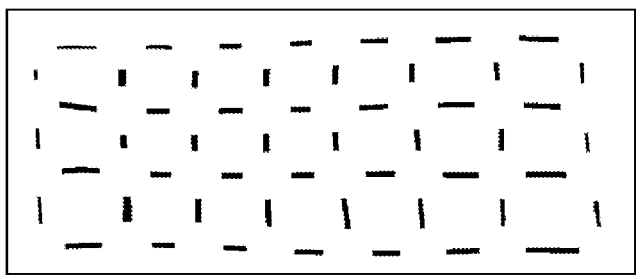

In step S208, the corner image (FIG. 24) is subtracted from the target CC image (FIG. 19) to obtain an image, referred to as the "line segment image" for convenience. Since the corners have been subtracted from the target CC, the line segment image contains line segments of the target CC broken by the corners. An example of the line segment image is shown in FIG. 25 (for the flowchart example of FIG. 19). FIG. 32 shows the resulting line segment image for the table example of FIG. 31.

Steps S207 and S208 also include a step of identifying the CCs in the corner image (FIG. 23, FIG. 31) and line segment image (FIG. 25, FIG. 32) by CC analysis.

In steps S209 and S210, the relationships between the corners and line segments are examined, and some corner CCs that are not true corners and line segments that do not connect true corners are removed. In these steps, any corner that is connected with only one line segment is removed, and any line segment that is connected with only one corner is removed. More specifically, in step S209, the CCs in the line segments image (FIG. 25, FIG. 32) is dilated, e.g. by 1 pixel. As a result, some corner CCs and line segment CCs now overlap one another, which indicates the relation of the corners and the line segments. In step S210, if a corner CC only overlaps with one line segment CC, the corner CC is removed from the corner CC image; after such corner CCs are removed, if a line segment CC only overlaps with one corner CC, the line segment CC is removed from the line segment image. The removal of corner CCs and removal of line segment CCs are repeated until no more corner or line segment can be removed. As a result, each corner CCs connects at least two line segments and each line segment connects at least two corners. The removal step S210 is designed to deal with the potential situation that some of the corners detected are not actual corners but only the end of a line.

This concludes process S104.

Process S105 is a table classifier which determines whether the target CC is a table. The details of process S105 are described below with reference to FIG. 3.

In step S301, the direction (horizontal, vertical, or neither) of each line segment is determined. The details of step S301 is described below with reference to FIG. 4. Enumerate all the line segments (steps S401, S411 and S412). Obtain the bounding box of the line (step S402). The bounding box (BB) of a CC is the smallest rectangular area that completely contains the CC. If the width (horizontal dimension) of the BB is much larger than (e.g., more than 2 times) the height (vertical dimension) of the BB ("yes" in step S403), the line segment is determined to be a horizontal line segment (step S408). If the height of the BB is much larger than (e.g., more than 2 times) the width of the BB ("yes" in step S404), the line segment is determined to be a vertical line segment (step S409). If neither is true ("no" in step S404), i.e. the BB height to width ratio is between 0.5 and 2, the centers of the corner CCs that the line segment connects are obtained, and the horizontal offset and vertical offset of these centers are calculated (step S405). If the horizontal offset is much larger than (e.g., more than 2 times) the vertical offset ("yes" in step S406), the line segment is determined to be a horizontal line segment (step S408). If the vertical offset is much larger than (e.g., more than 2 times) the horizontal offset ("yes" in step S407), the line segment is determined to be a vertical line segment (step S409). Otherwise ("no" in step S407), the line segment is deemed as an unknown line segment (step S410).

Referring back to FIG. 3, in step S302, each corner is put into a horizontal list and/or a vertical list or an unknown list based on the line segments that connect them. More specifically, if two corners are connected by a horizontal line segment, they are put into the same horizontal list; if two corners are connected by a vertical line segment, they are put into the same vertical list. If one corner from a horizontal list and another corner from another horizontal list are connected by a horizontal line segment or an unknown line segment, merge these two horizontal lists into one horizontal list. If one corner from a vertical list and another corner from another vertical list are connected by a vertical line segment or unknown line segment, merge these two vertical lists into one vertical list. Corners that are only connected to other corners by unknown (neither vertical nor horizontal) line segments are put into the unknown list.

As a result, two sets of lists of corners are obtained, one set being a set of horizontal lists, each list containing a list of corners deemed to be on the same horizontal line, the other set being a set of vertical lists, each list containing a list of corners deemed to be on the same vertical line. In the table example of FIG. 32, it can be seen that a set of four horizontal lists and a set of eight vertical lists will be generated.

Next, in process S303, a cross check with the vertical and the horizontal line segments is performed, based on the assumption that for a table structure each corner should connect both a horizontal line and a vertical line. In this process, for any corner in a horizontal list, if it is not present in any vertical list or unknown list, the corner is deleted from the horizontal list; for any corner in a vertical list, if is not present in any horizontal list or unknown list, the corner is deleted from the vertical list.

Then, process S304 is performed to determine whether the target CC image is a table. The details of process S304 is explained below with reference to FIG. 5.

First, remove horizontal lists that have fewer corners than the average number of corners of all horizontal lists, and the number of remaining horizontal lists is denoted $lh_1$ (step S501). Similarly, remove vertical lists that have fewer corners than the average number of corners of all vertical lists, and the number of remaining vertical lists is denoted $lv_1$ (step S502). Then, sort the numbers of corners in the remaining vertical lists from low to high, and the number of corners at a predetermined rank is denoted $lh_2$ (step S503). The predetermined rank may be, for example, a 75% rank, i.e., about 75% of the sorted numbers are lower than $lh_2$. Similarly, sort the numbers of corners in the remaining horizontals lists from low to high, and the number of corners at the predetermined rank is denoted $lv_2$ (step S504).

If the difference between $lh_1$ and $lh_2$ and the difference between $lv_1$ and $lv_2$ are both smaller than respective thresholds (e.g. 25% of the respective average of the two numbers) (step S505), the target CC is determined to be a table (step S506). Otherwise, the target CC is determined not to be a table (step S507).

This concludes process S304 and therefore process S105.

Referring back to FIG. 1, process S106 is a flowchart classifier which determines whether the target CC is a flowchart. The details of process S106 are described below with reference to FIG. 6. Note that the flowchart classifier process S106 is performed after the table classifier process S105; process S106 is performed only if it has been determined in process S105 that the target CC is not a table.

Figure 26:
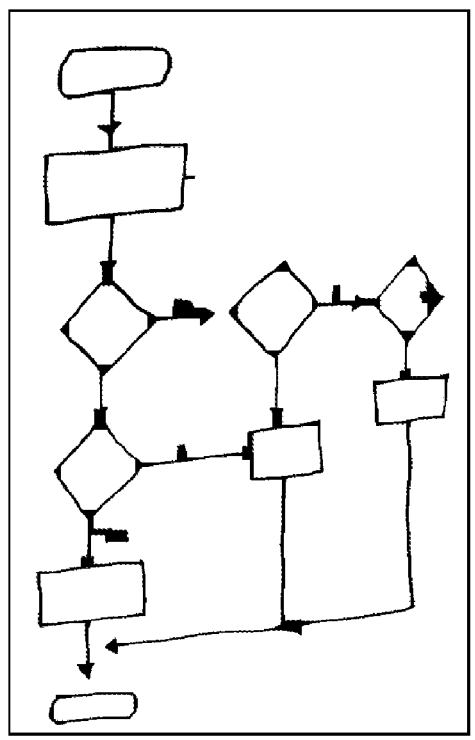
Figure 27:
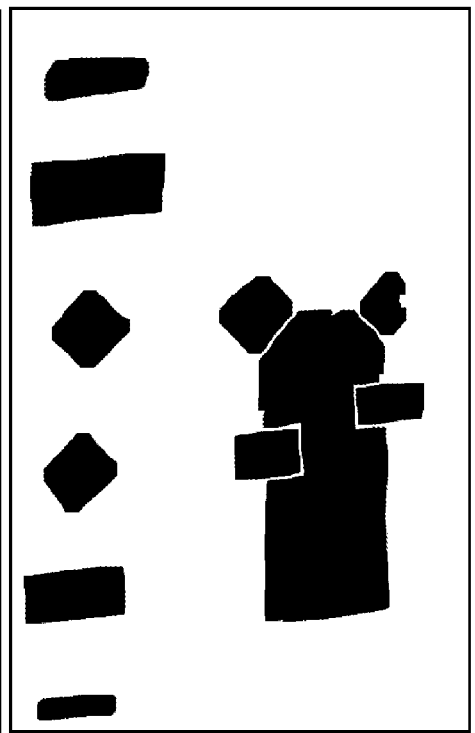

First, apply a close operation to the target CC image (FIG. 9) (step S601); the resulting image is referred to as a "target close" image, an example of which (for the example of FIG. 9) is shown in FIG. 26. This step is designed to make sure that the boundary boxes of the flowchart are not open lines (which may exist sometimes, especially in hand written flowcharts). Then, apply a flood fill operation to the target close image from four corners of the image, and invert the resulting image (step S602). The image resulting from the flood fill and invert operations is referred to as the "flood fill image" for convenience, an example of which (for the example of FIG. 26) is shown in FIG. 27. Perform CC analysis on the flood fill image (step S602). These CCs are potential boundary boxes of a flowchart, and are referred to as "potential boundary box CC" for convenience.

For each potential boundary box CC, identify the line segments CCs, from the line segment image (FIG. 25), and the corner CCs, from the corner image (FIG. 24), that overlap with (i.e. touch) the potential boundary box CC (step S603). These are the corner and line segment CCs that encircle the potential boundary box.

If any potential boundary box CC does not contain any other CCs of the original image (as obtained in step S101), i.e., the potential boundary box CC is empty of contents, it is eliminated as a potential boundary box CC from the flood fill image (step S604).

Steps S605-S611 are performed to identify those line segments that connect two potential boundary boxes (connector line segments).

Figure 28:
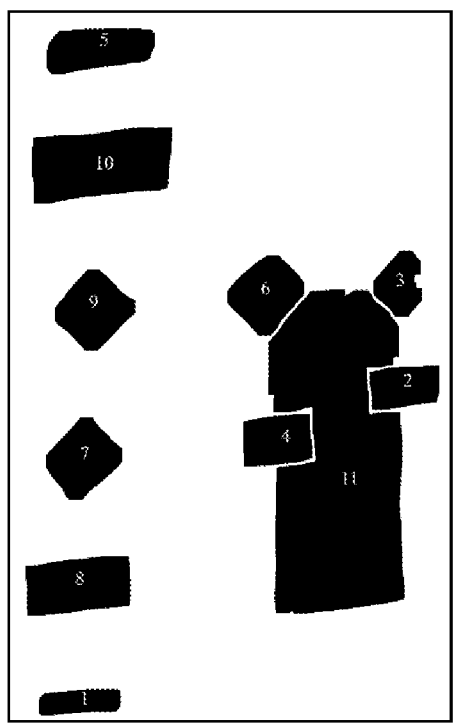

First, sort the remaining potential boundary box CCs based on their areas from small to large (step S605). In FIG. 28, which is identical to FIG. 27, the potential boundary box CCs are illustrated with labels from 1 to 11 according to their areas. Then, steps S606 to S611 are performed to label each line segment CC as either a boundary line segment or a connector line segment.

Initially, all line segments are labeled "unknown", i.e., neither boundary line segment nor connector line segment (step S606). Starting from the smallest potential boundary box CC, it is determined whether any of the line segment that encircle the potential boundary box has been labeled a connector line segment (step S607). Note that for the smallest potential boundary box, none of the encircling line segments will have been labeled a connector line segment. If none of them has been labeled a connector line segment ("no" in step S607), then all the encircling line segments are labeled boundary line segments, and all line segments that are connected to any of these boundary line segments by corners are labeled connector line segments (step S608). If in step S607 at least one of the encircling line segments has been labeled a connector line segment ("yes" in step S607), then no changes in labels are made to any line segments (step S609). Steps S607, S608 and S609 are repeated for the next larger potential boundary box CC until all potential boundary box CC are processed (step S610). These steps are designed so that if a potential boundary box is in fact not a boundary box but a closed shape formed by connector lines, such as the potential boundary box labeled "11" in the example of FIG. 28, its encircling lines will not be labeled boundary lines.

Figure 29:
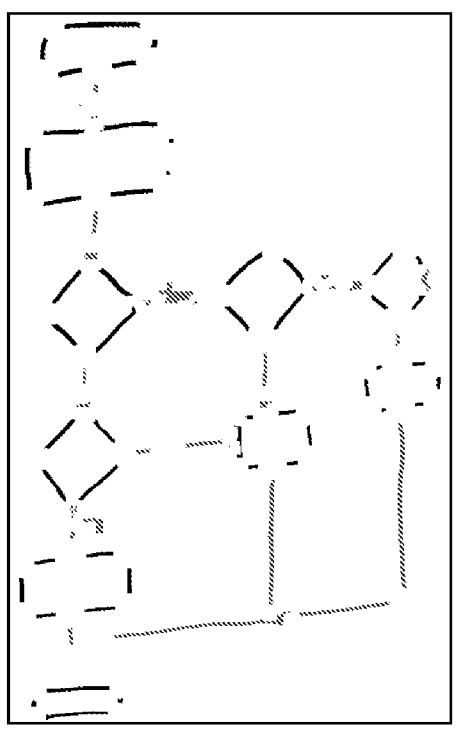
Figure 30A:
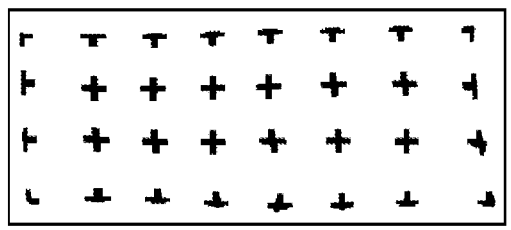
Figure 30B:
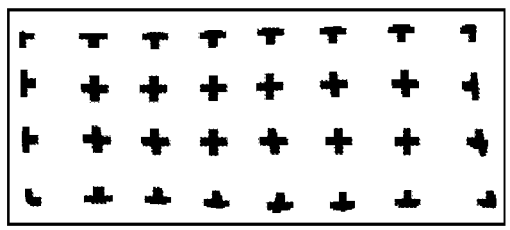
Figure 30C:
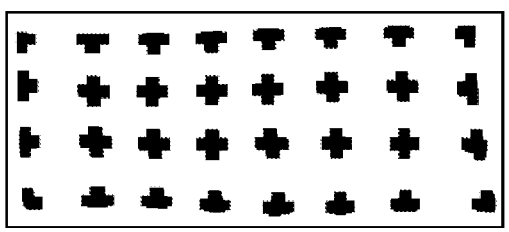
Figure 30D:
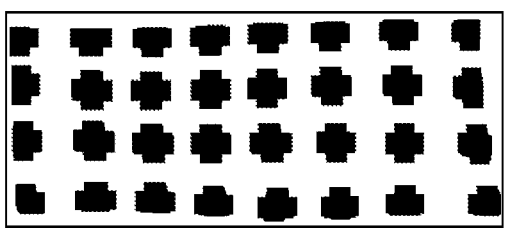

After all potential boundary boxes are processed, the line segments that are still labeled unknown are then labeled connector line segments (step S611). As a result, all the line segments are labelled either boundary line segments or connector line segments. The boundary line segments are expected to be lines that delineate boundary boxes, i.e., polygon or other shape of the flowchart, and the connector line segments are expected to be lines that connect the boundary boxes. FIG. 29 shows an example of the result, where boundary line segments are shown in black and the connector line segments are shown in gray color.

The connector lines are put into one or more connecting routes (step S612). More specifically, if any two of the connector line segments are connected by a corner, they are put in the same connecting route. This is designed to account for the fact that some connector lines in flowcharts may change direction and some may join each other at T junctions. Each connector line segment not connected by corners to any other connector line segment forms its own connecting route. As a result of step S612, all connector line segments are put into several connecting routes and each route will connect several potential boundary boxes.

For each potential boundary box, if all its encircling line segments are labelled boundary line segments and the potential boundary box is connected to at least one other potential bounding box by at least one connecting route, it is recognized as a boundary box (step S613). In the example of FIGS. 28 and 29, the potential boundary box labeled "11" will not be recognized as a boundary box, but all other ones will be.

Next, the number of boundary boxes is counted (step S614). More specifically, if any two boundary boxes are connected to each other by more than one connecting route, they are each counted as one half in the counting; if a boundary box is connected with other boundary boxes all by only one connecting route each, it is counted as one in the counting. Boundary boxes not connected to any other boundary boxes will not be used in the counting.

Finally, if the number of boundary boxes counted is three or more, the target CC is determined to be a flowchart (step S615). This concludes process S106.

Figure 33:
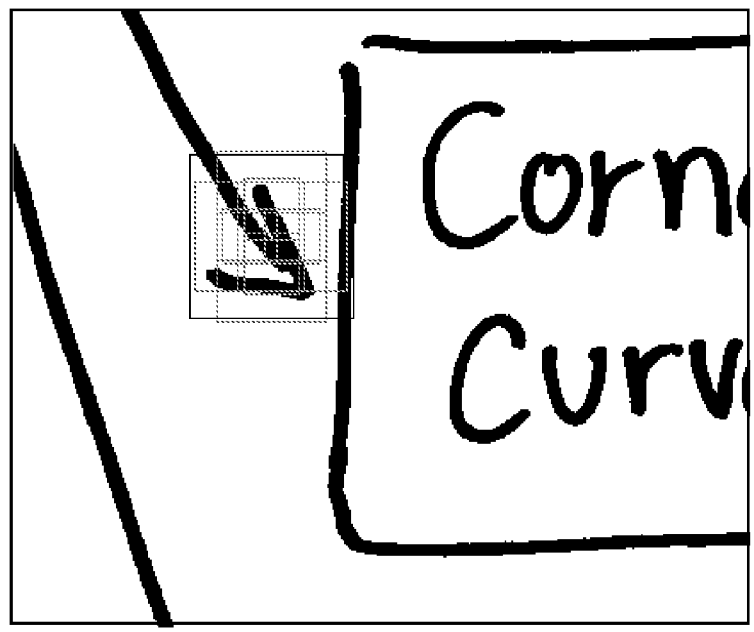
Figure 34:
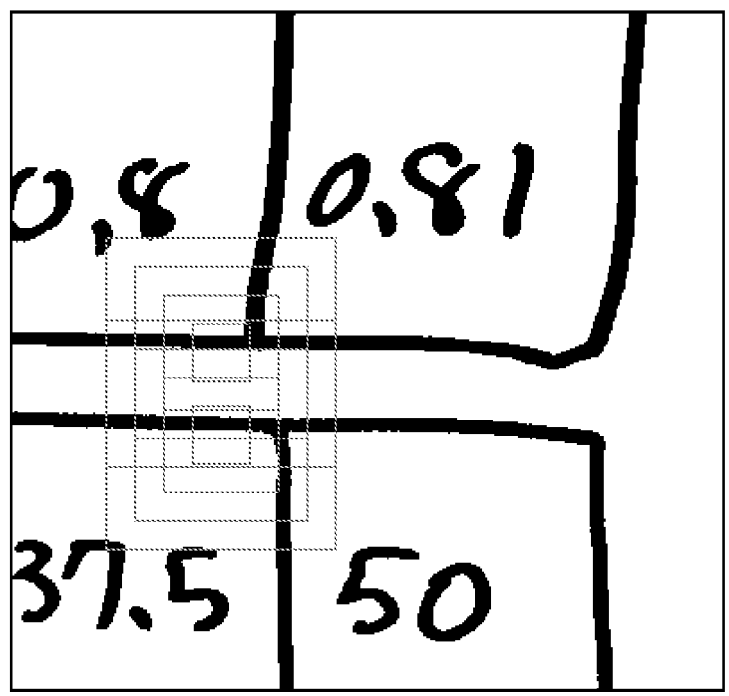

Now, a preferred method for determining whether a CC is an arrow line, useful in Phase I and Phase III of process S103, is described below using the examples shown in FIGS. 33 and 34. In Phase I and Phase III described above, it has been determined that some pixels are involved with two or more CCs that are close to each other; the arrow line detection method determines whether any of these CCs is an arrow line.

First, pick out a number of pixels (e.g. 100 pixels) on the involved CCs that are closest to another CC. Then determine the left, right, top and bottom range of these pixels, denoted l, r, t, and b. Construct five centers as follows:

$$\left(\frac{l+3r}{4},\frac{t+b}{2}\right),\left(\frac{3l+r}{4},\frac{t+b}{2}\right),\left(\frac{l+r}{2},\frac{t+b}{2}\right),\left(\frac{l+r}{2},\frac{3t+b}{4}\right),$$
$$\left(\frac{l+r}{2},\frac{t+3b}{4}\right),$$

i.e., they are at the center of the range and half way between the center and the four sides of the range. At each of the five centers, construct a series of concentric squares at various sizes. The sizes are based on the distance used in the close operation in Phase I and Phase III. If for at least one of these squares, a CC only crosses one of the four square borders, the CC is determined to be a part of an arrow line. For example, in the example shown in FIG. 33, the CC of the arrow only crosses the top border of the largest square, so this CC will be determined an arrow line. FIG. 34 shows another example; here, although parts of the two tables are close to one another, there does not exist a square that satisfies the above requirement. Thus, neither of the involved CCs is determined to be an arrow line. Note here that the CCs being examined are from the original image before the close operation or other operations.

Figure 35:
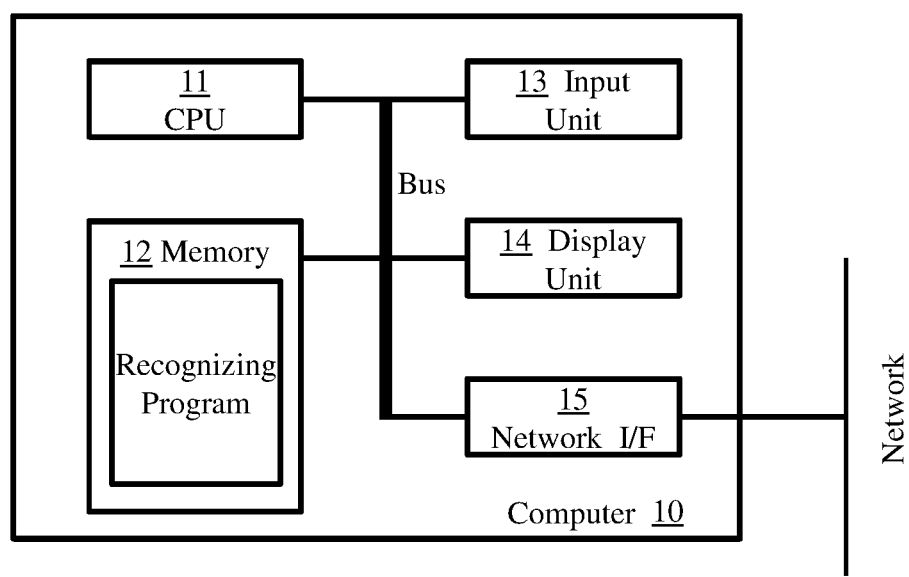
FIG. 35 schematically illustrates a computer apparatus in which embodiments of the present invention may be implemented.

The document image recognition methods described here can be implemented in a data processing system such as a computer 10 as shown in FIG. 35. The computer 10 comprises a processor (CPU) 11, a memory 12 which stores software programs, where the programs are executed by the processor 11 to carry out the described methods. The computer 10 may optionally contain an input unit 13, a display 14, and a network interface 15.

It will be apparent to those skilled in the art that various modification and variations can be made in the table and flowchart detection method and related apparatus of the present invention without departing from the spirit or scope of the invention. Thus, it is intended that the present invention cover modifications and variations that come within the scope of the appended claims and their equivalents.

What is claimed is:

1. A method implemented in a data processing apparatus for recognizing an input document image as a table or a flowchart, the method comprising:
   (a) detecting a target connected component from the input image which represents candidates of lines of a table or text boxes and connecting lines of a flowchart in the input image;
   (b) separating the target connected component into a plurality of corners and a plurality of edges that connect the plurality of corners, including:
      (b1) applying a corner detector operation to the target connected component to detect a plurality of corners and generate a plurality of corner connected components (corner CCs); and
      (b2) processing the plurality of corner CCs, including dilating at least some of the corner CCs, to generate a corner image containing the plurality of processed corner CCs, and subtracting the corner image from an image of the target connected component to obtain the plurality of edges which are divided by the plurality of corner CCs; and
   (c) based on spatial relationships between the plurality of corners and the plurality of edges, determining whether the target connected component is a table or a flowchart or neither.

2. The method of claim 1, wherein step (a) includes:
   performing a connected component analysis to identify all connected components in the input image;
   detecting large connected components that are larger than a threshold size; and
   merging some of the large connected components together based on their spatial relationships to form the target connected component.

3. The method of claim 1, wherein step (b) further includes:
   (b3) removing any corner that is connected with only one edge, and removing any edge that is connected with only one corner.

4. The method of claim 1, wherein in step (b2), the step of processing the plurality of corner CCs to generate a corner image includes:
   dilating the plurality of corner CCs multiple times using different dilation sizes to generate multiple dilated corner CCs of different sizes; and
   for each of the plurality of corner CCs, identifying the largest one of the corresponding dilated corner CCs that does not result in the corner CC being connected with another corner CC, to generate a corner image.

5. A method implemented in a data processing apparatus for recognizing an input document image as a table or a flowchart, the method comprising:
   (a) detecting a target connected component from the input image which represents candidates of lines of a table or text boxes and connecting lines of a flowchart in the input image;
   (b) separating the target connected component into a plurality of corners and a plurality of edges that connect the plurality of corners; and
   (c) based on spatial relationships between the plurality of corners and the plurality of edges, determining whether the target connected component is a table or a flowchart or neither, including:
      (c1) determining whether each edge is a horizontal edge, a vertical edge, or an unknown edge;
      (c2) forming one or more horizontal lists of corners and one or more vertical lists of corners, each horizontal list of corners containing corners that are connected to each other by horizontal edges or known edges, each vertical list of corners containing corners that are connected to each other by vertical edges or known edges; and
      (c3) determining whether or not the target connected component is a table based on numbers of corner in the one or more horizontal lists of corners and the one or more vertical lists of corners.

6. The method of claim 5, wherein step (c2) further includes:

forming an unknown list of corners which includes corners that are only connected by unknown edges;
removing any corner from a horizontal list if the corner is not also contained in a vertical list or the unknown list, and removing any corner from a vertical list if the corner is not also contained in a horizontal list or the unknown list.

7. The method of claim 5, wherein step (c3) includes:
determining a number of corners in each of the horizontal list of corners and each of the vertical list of corners;
calculating an average number of corners for all horizontal lists of corners;
removing any horizontal list of corners that contains fewer corners than the average number of corners in all horizontal lists of corners, and determining a number $lh_1$ of remaining horizontal lists;
calculating an average number of corners for all vertical lists of corners;
removing any vertical list of corners that contains fewer corners than the average number of corners in all vertical lists of corners, and determining a number $lv_1$ of remaining vertical lists;
sorting the numbers of corners in the remaining vertical lists from low to high, and determining a number $lh_2$ at a predetermined rank of the sorted numbers;
sorting the numbers of corners in the remaining horizontal lists from low to high, and determining a number $lv_2$ at a predetermined rank of the sorted numbers; and
determining the target connected component to be a table if a difference between $lh_1$ and $lh_2$ is smaller than a first threshold value and a difference between $lv_1$ and $lv_2$ is smaller than a second threshold value.

8. The method of claim 5, wherein step (c) further includes:
if in step (c3) it is determined that the target connected component is not a table, then determining whether or not the target connected component is a flowchart, including:
(c4) detecting one or more potential boundary boxes, including:
performing a close operation on a target image formed by the target connected component;
applying a flood fill operation to the target image after the close operation;
inverting the target image after the flood fill operation; and
detecting connected components after the inverting operation, wherein the detected connected components constitute the potential boundary boxes;
(c5) from among the edges detected in step (b), identifying those that connect two potential boundary boxes as connector edges;
(c6) for each potential boundary box, if the potential boundary box is not encircled by any connector edges and is connected to one or more other potential boundary box by one or more connector edges, identifying the potential boundary box as a boundary box;
(c7) using the boundary boxes identified in step (c6), counting a number of boundary boxes; and
(c8) determining the target connected component to be a flowchart if the counted number of boundary boxes is greater than a threshold number.

9. The method of claim 8, wherein step (c5) includes:
sorting the potential boundary boxes into an order from small to large;
initially labeling all edges as unknown edges; and
starting from the smallest potential boundary box and in the sorted order, for each potential boundary box:
if no edge that encircle the potential boundary box has been labeled a connector edge, then labeling all edges that encircle the potential boundary box as boundary edges and labeling all edges that are connected to any of the encircling boundary edges by corners as connector edges, and
otherwise leaving labels of all edges unchanged.

10. A computer program product comprising a computer usable non-transitory medium having a computer readable program code embedded therein for controlling a data processing apparatus, the computer readable program code configured to cause the data processing apparatus to execute a process for recognizing an input document image as a table or a flowchart, the process comprising:
(a) detecting a target connected component from the input image which represents candidates of lines of a table or text boxes and connecting lines of a flowchart in the input image;
(b) separating the target connected component into a plurality of corners and a plurality of edges that connect the plurality of corners, including:
(b1) applying a corner detector operation to the target connected component to detect a plurality of corners and generate a plurality of corner connected components (corner CCs); and
(b2) processing the plurality of corner CCs, including dilating at least some of the corner CCs, to generate a corner image containing the plurality of processed corner CCs, and subtracting the corner image from an image of the target connected component to obtain the plurality of edges which are divided by the plurality of corner CCs; and
(c) based on spatial relationships between the plurality of corners and the plurality of edges, determining whether the target connected component is a table or a flowchart or neither.

11. The computer program product of claim 10, wherein step (a) includes:
performing a connected component analysis to identify all connected components in the input image;
detecting large connected components that are larger than a threshold size; and
merging some of the large connected components together based on their spatial relationships to form the target connected component.

12. The computer program product of claim 10, wherein step (b) further includes:
(b3) removing any corner that is connected with only one edge, and removing any edge that is connected with only one corner.

13. The computer program product of claim 10, wherein in step (b2), the step of processing the plurality of corner CCs to generate a corner image includes:
dilating the plurality of corner CCs multiple times using different dilation sizes to generate multiple dilated corner CCs of different sizes; and
for each of the plurality of corner CCs, identifying the largest one of the corresponding dilated corner CCs that does not result in the corner CC being connected with another corner CC, to generate a corner image.

14. A computer program product comprising a computer usable non-transitory medium having a computer readable program code embedded therein for controlling a data processing apparatus, the computer readable program code configured to cause the data processing apparatus to execute a process for recognizing an input document image as a table or a flowchart, the process comprising:
- (a) detecting a target connected component from the input image which represents candidates of lines of a table or text boxes and connecting lines of a flowchart in the input image;
- (b) separating the target connected component into a plurality of corners and a plurality of edges that connect the plurality of corners; and
- (c) based on spatial relationships between the plurality of corners and the plurality of edges, determining whether the target connected component is a table or a flowchart or neither, including:
  - (c1) determining whether each edge is a horizontal edge, a vertical edge, or an unknown edge;
  - (c2) forming one or more horizontal lists of corners and one or more vertical lists of corners, each horizontal list of corners containing corners that are connected to each other by horizontal edges or known edges, each vertical list of corners containing corners that are connected to each other by vertical edges or known edges; and
  - (c3) determining whether or not the target connected component is a table based on numbers of corner in the one or more horizontal lists of corners and the one or more vertical lists of corners.

15. The computer program product of claim 14, wherein step (c2) further includes:
   forming an unknown list of corners which includes corners that are only connected by unknown edges;
   removing any corner from a horizontal list if the corner is not also contained in a vertical list or the unknown list, and removing any corner from a vertical list if the corner is not also contained in a horizontal list or the unknown list.

16. The computer program product of claim 14, wherein step (c3) includes:
   determining a number of corners in each of the horizontal list of corners and each of the vertical list of corners;
   calculating an average number of corners for all horizontal lists of corners;
   removing any horizontal list of corners that contains fewer corners than the average number of corners in all horizontal lists of corners, and determining a number $lh_1$ of remaining horizontal lists;
   calculating an average number of corners for all vertical lists of corners;
   removing any vertical list of corners that contains fewer corners than the average number of corners in all vertical lists of corners, and determining a number $lv_1$ of remaining vertical lists;
   sorting the numbers of corners in the remaining vertical lists from low to high, and determining a number $lh_2$ at a predetermined rank of the sorted numbers;
   sorting the numbers of corners in the remaining horizontal lists from low to high, and determining a number $lv_2$ at a predetermined rank of the sorted numbers; and
   determining the target connected component to be a table if a difference between $lh_1$ and $lh_2$ is smaller than a first threshold value and a difference between $lv_1$ and $lv_2$ is smaller than a second threshold value.

17. The computer program product of claim 14, wherein step (c) further includes:
   if in step (c3) it is determined that the target connected component is not a table, then determining whether or not the target connected component is a flowchart, including:
   - (c4) detecting one or more potential boundary boxes, including:
     performing a close operation on a target image formed by the target connected component;
     applying a flood fill operation to the target image after the close operation;
     inverting the target image after the flood fill operation; and
     detecting connected components after the inverting operation, wherein the detected connected components constitute the potential boundary boxes;
   - (c5) from among the edges detected in step (b), identifying those that connect two potential boundary boxes as connector edges;
   - (c6) for each potential boundary box, if the potential boundary box is not encircled by any connector edges and is connected to one or more other potential boundary box by one or more connector edges, identifying the potential boundary box as a boundary box;
   - (c7) using the boundary boxes identified in step (c6), counting a number of boundary boxes; and
   - (c8) determining the target connected component to be a flowchart if the counted number of boundary boxes is greater than a threshold number.

18. The computer program product of claim 17, wherein step (c5) includes:
   sorting the potential boundary boxes into an order from small to large;
   initially labeling all edges as unknown edges; and
   starting from the smallest potential boundary box and in the sorted order, for each potential boundary box:
     if no edge that encircle the potential boundary box has been labeled a connector edge, then labeling all edges that encircle the potential boundary box as boundary edges and labeling all edges that are connected to any of the encircling boundary edges by corners as connector edges, and
     otherwise leaving labels of all edges unchanged.

* * * * *